(12) United States Patent
Caporal Del Barrio et al.

(10) Patent No.: US 12,075,367 B2
(45) Date of Patent: Aug. 27, 2024

(54) SIGNALING POWER EXPOSURE EVENTS

(71) Applicant: Nokia Technologies Oy, Espoo (FI)

(72) Inventors: Samantha Caporal Del Barrio, Aalborg (DK); Simon Svendsen, Aalborg (DK); Nuno Manuel Kiilerich Pratas, Gistrup (DK); Karri Markus Ranta-Aho, Espoo (FI); Sari Kaarina Nielsen, Espoo (FI); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 419 days.

(21) Appl. No.: 17/621,797

(22) PCT Filed: Jun. 28, 2019

(86) PCT No.: PCT/EP2019/067446
§ 371 (c)(1),
(2) Date: Dec. 22, 2021

(87) PCT Pub. No.: WO2020/259852
PCT Pub. Date: Dec. 30, 2020

(65) Prior Publication Data
US 2022/0264481 A1 Aug. 18, 2022

(51) Int. Cl.
*H04W 52/36* (2009.01)
*H04W 52/14* (2009.01)

(52) U.S. Cl.
CPC ....... *H04W 52/367* (2013.01); *H04W 52/146* (2013.01); *H04W 52/365* (2013.01)

(58) Field of Classification Search
None
See application file for complete search history.

(56) References Cited

U.S. PATENT DOCUMENTS

| 2014/0370929 A1 | 12/2014 | Khawand et al. ............ 455/522 |
| 2019/0261289 A1* | 8/2019 | Raghavan ........... H04W 52/367 |

(Continued)

FOREIGN PATENT DOCUMENTS

| WO | WO 2012/091651 A1 | 7/2012 |
| WO | WO 2017/196612 A1 | 11/2017 |

OTHER PUBLICATIONS

3GPP TSG RAN WG1 Ad-Hoc Meeting 1901, Taipei, Taiwan, Jan. 21-25, 2019, R1-1900252, "Further considerations on Mode 1 resource allocation for NR-V2X", Fujitsu, 2 pgs.

(Continued)

*Primary Examiner* — German Viana Di Prisco
(74) *Attorney, Agent, or Firm* — Barta Jones, PLLC

(57) ABSTRACT

Various example embodiments provide a system for mitigating effects of a power back-off due to exposure of user's body to transmitted power. A user equipment (UE) may determine triggering of a power exposure event, for example a body of a user coming close enough to trigger a maximum permissible exposure (MPE) limit. The UE may then send an emergency signal including an indication of the triggered power exposure event to a base station. Various beneficial options for rapidly providing the emergency signal are disclosed. The UE and the base station may enter an emergency mode, where the UE may provide further information on its power back-off conditions. Based on the information received from the UE, the base station may determine to perform adaptation of the radio link to avoid radio link failure. Apparatuses, methods, and computer programs are disclosed.

20 Claims, 10 Drawing Sheets

(56) References Cited

U.S. PATENT DOCUMENTS

| | | | |
|---|---|---|---|
| 2020/0195290 A1* | 6/2020 | Khawand | H04W 52/226 |
| 2022/0006507 A1* | 1/2022 | Guan | H04B 7/0695 |
| 2022/0132431 A1* | 4/2022 | Zhao | H04W 52/367 |

OTHER PUBLICATIONS

3GPP TSG RAN WG1 Meeting #96bis, Xi'an, China, Apr. 8-12, 2019, R1-1905229, "On FR2 RF Exposure mitigation methods", Nokia, Nokia Shanghai Bell, 3 pgs.

"Required P-MPR/UL dutycycle restriction for MPE regulations at FR2", LG Electronics, 3GPP TSG-RAN WG4 Meeting #90, R4-1900252, Mar. 2019, 5 pages.

* cited by examiner

| CQI index | Modulation | Code rate x 1024 | Efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 11

| Field | Bitwidth |
|---|---|
| Rank Indicator | $\min(2, \lceil \log_2 n_{RI} \rceil)$ |
| Layer Indicator | $\min(2, \lceil \log_2 \upsilon \rceil)$ |
| Wide-band CQI | 4 |
| Subband differential CQI | 2 |
| CRI | $\lceil \log_2(K_s^{CSI-RS}) \rceil$ |

FIG. 12

SIGNALING POWER EXPOSURE EVENTS

CROSS REFERENCE TO RELATED APPLICATION

This patent application is a U.S. National Stage application of International Patent Application Number PCT/EP2019/067446 filed Jun. 28, 2019, which is hereby incorporated by reference in its entirety.

TECHNICAL FIELD

Various example embodiments generally relate to the field of wireless communications. In particular, some example embodiments relate to mitigating effects of a power back-off due to exposure of user's body to transmitted energy.

BACKGROUND

In various wireless communication technologies, such as 3GPP long-term evolution (LTE) 4G and 5G new radio (NR), a user node, such as a mobile phone, may adjust its transmit power according to radio link conditions. However, the transmit power may be regulated in order to protect the user from excessive radiation. For example, when a user is located at the path of a beam from a base station, the transmit power may need to be reduced in order to comply with the regulations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a system for mitigating effects of a power back-off due to exposure of the user to the transmitted power. For example, a radio link failure may be avoided by adapting the radio link such that power exposure requirements are met without excessive reduction of transmit power. These benefits may be achieved by the features of the independent claims. Further implementation forms are provided in the dependent claims, the description, and the drawings.

According to an aspect, an apparatus comprises at least one processor and at least one memory including computer program code, the at least one memory and the computer code configured to, with the at least one processor, cause the apparatus at least to: determine triggering of a power exposure event at a user node; send an indication of the triggered power exposure event to a network node; determine an expected power reduction for complying with a power exposure requirement; and send an indication of the expected power reduction to the network node.

According to an aspect, a method comprises determining triggering of a power exposure event at a user node; sending an indication of the triggered power exposure event to a network node; determining an expected power reduction for complying with a power exposure requirement; and sending an indication of the expected power reduction to the network node.

According to an aspect, a computer program is configured, when executed by an apparatus, to cause the apparatus at least to: determine triggering of a power exposure event at a user node; send an indication of the triggered power exposure event to a network node; determine an expected power reduction for complying with a power exposure requirement; and send an indication of the expected power reduction to the network node.

According to an aspect, an apparatus comprises means for determining triggering of a power exposure event at a user node; means for sending an indication of the triggered power exposure event to a network node; means for determining an expected power reduction for complying with a power exposure requirement; and means for sending an indication of the expected power reduction to the network node.

According to an aspect, an apparatus comprises at least one processor and at least one memory including computer program code, the at least one memory and the computer code configured to, with the at least one processor, cause the apparatus at least to: receive, at a network node, an indication of a power exposure event triggered at a user node; receive, at the network node, an indication of an expected power reduction and/or an expected duty cycle reduction from the user node; and in response to receiving the indication of the triggered power exposure event and the expected power reduction and/or duty cycle reduction, perform adaptation of a radio link between the network node and the user node.

According to an aspect, a method comprises receiving, at a network node, an indication of a power exposure event triggered at a user node; receiving, at the network node, an indication of an expected power reduction and/or an expected duty cycle reduction from the user node; and in response to receiving the indication of the triggered power exposure event and the expected power reduction and/or duty cycle reduction, performing adaptation of a radio link between the network node and the user node.

According to an aspect, a computer program is configured, when executed by an apparatus, to cause the apparatus at least to: receive, at a network node, an indication of a power exposure event triggered at a user node; receive, at the network node, an indication of an expected power reduction and/or an expected duty cycle reduction from the user node; and in response to receiving the indication of the triggered power exposure event and the expected power reduction and/or duty cycle reduction, perform adaptation of a radio link between the network node and the user node.

According to an aspect, an apparatus comprises means for receiving, at a network node, an indication of a power exposure event triggered at a user node; means for receiving, at the network node, an indication of an expected power reduction and/or an expected duty cycle reduction from the user node; and means for performing adaptation of a radio link between the network node and the user node, in response to receiving the indication of the triggered power exposure event and the expected power reduction and/or duty cycle reduction.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 11 illustrates an example of channel quality information, according to an example embodiment;

FIG. 12 illustrates an example of bitwidth associated with different fields, according to an example embodiment;

Like references are used to designate like parts in the accompanying drawings.

DETAILED DESCRIPTION

Figure 1:
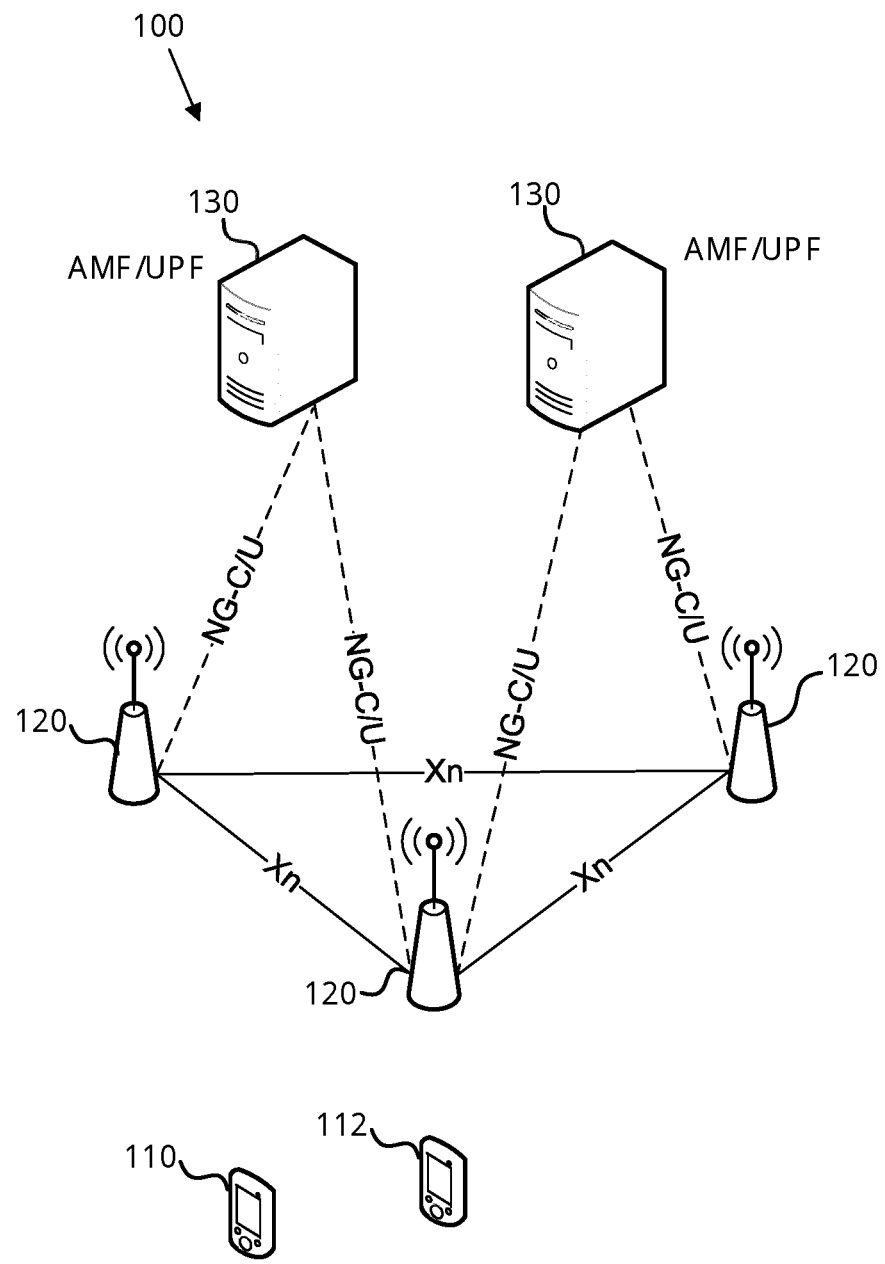
FIG. 1 illustrates an example of a network comprising network nodes and client nodes, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As the number of online services dramatically increases every year, the thirst for bandwidth is insatiable. The millimeter-wave (mmW) spectrum, for example Frequency Range 2 (FR2) between 24 GHz and 52 GHz, offers the possibility of using large portions of contiguous bandwidth to address high-throughput applications. To compensate for the increased path loss at mmW, 5G antennas may provide a gain of around 10 dB at a user equipment (UE) and 20 dB at a base station (BS). However, when operating at high frequencies with high gain antennas, the effects to the users should be considered. Therefore, governmental exposure guidelines may regulate the maximum allowed transmit power on the UE.

Maximum permissible exposure (MPE) may comprise a regulation on power density (PD). A threshold for MPE may be for example set at 10 W/m2 (1 mW/cm2 between 6 GHz and 100 GHz or between 10 GHz and 100 GHz, for example depending on the regulator. The energy absorbed by the human body may increase as the distance to the UE decreases. Therefore, to comply with the MPE limit, the UE may be configured to reduce its output power if the user gets in close vicinity of the antenna. This may be referred to as power back-off (PBO).

When operating under MPE regulations, a UE may detect a power exposure event. A power exposure event may refer to not complying with a power exposure requirement, for example exceeding the MPE limit or alternatively being within a margin from the MPE limit. Determining a power exposure event may therefore comprise determining non-compliance with a power exposure requirement. For example, when distance to the user decreases, maintaining transmit power at the same level may cause the power density at user's body to exceed the threshold for MPE. In such a situation the UE may determine that a power exposure event has been triggered. Determining triggering the power exposure event may be based on various parameters. For example, to determine the power density at user's current location the UE may consider the current transmit power, but also any parameters affecting the radiation pattern. Power density limits corresponding to different distances from the user may be preconfigured at the UE or received from another device, such as for example a server. Power density limits may be dependent on one or more operating parameters such as for example the current frequency range.

Detecting whether the user gets in the vicinity of the antenna may be done based on proximity sensors suitable for human body detection. For example, a dedicated mechanism may be built in a device to detect nearby objects including humans. This may be implemented in many ways including using the antenna array as a radar. Based on the proximity sensor, the device may be configured to autonomously back its TX power off to comply with MPE requirements. In a 5G system the power back-off can be high, potentially leading to a radio link failure (RLF). The consequences of a large power back-off in an FR2 directive link may be more severe than in a lower legacy spectrum, for example in Frequency Range 1 (FR1).

According to an example embodiment a UE may determine triggering of a power exposure event, for example a body of a user coming close enough to trigger an MPE limit. The UE may then send an emergency signal comprising an indication of the triggered power exposure event to a base station. Various beneficial options for rapidly providing the emergency signal are disclosed. The UE and the base station may enter an emergency mode, where the UE may provide further information on its power back-off conditions. Based on the information received from the UE, the base station may determine to perform adaptation of the radio link to avoid radio link failure.

FIG. 1 illustrates an example embodiment of a network 100. The network 100 may comprise one or more core network elements such as for example Access and Mobility Management Function (AMF) and/or User Plane Function (UPF) 130, one or more base stations, represented in the example of FIG. 1 by a gNBs 120. The network 100 may further comprise a plurality of client nodes, represented in the example of FIG. 1 by user equipment (UE) 110 and 112, which may be also referred to as a user nodes. UEs 110 and 112 may communicate with one or more of the base stations via wireless radio channel(s). The base stations may be configured to communicate with the core network elements over a communication interface, such as for example control plane or user plane interface NG-C/U. Base stations may be also called radio access network (RAN) nodes. Functionality of a base station may be distributed between a central unit (CU), for example a gNB-CU, and one or more distributed units (DU), for example gNB-DUs. Network elements AMF/UPF 130, gNB 120, gNB-CU, and gNB-DU may be generally referred to as network nodes or network devices. Although depicted as a single device, a network node may not be a stand-alone device, but it may be implemented for example as a distributed computing system coupled to a remote radio head. For example, a cloud radio access network (cRAN) may be applied to split control of wireless functions to optimize performance and cost.

Network 100 may be configured for example in accordance with the 5th Generation digital cellular communication network, as defined by the 3rd Generation Partnership Project (3GPP). In one example, network 100 may operate according to 3GPP 5G-NR (5G New Radio). It is however appreciated that example embodiments presented herein are not limited to this example network and may be applied in any present or future wireless or wired communication networks, for example other type of cellular networks, short-range wireless networks, broadcast networks, or the like.

In a split architecture scenario, central unit of a base station may comprise a physical or logical node and may include functions such as for example transfer of user data, mobility control, radio access network sharing, positioning, session management, or the like, except for functions that may be allocated to the distributed unit(s). The central unit may be connected to the one or more distributed units over a communication interface, for example an F1 interface. The one or more distributed units may be physical or logical nodes that may be configured to provide a subset of base station functions, depending on how the functions are split between the central unit and the distributed unit(s). The distributed unit(s) may be controlled by the central unit through the communication interface. A base station may be connected to other radio access network nodes by another communication interface, for example an Xn interface. It is appreciated that network functionality described herein may be implemented at gNB 120, or divided between a gNB-CU and a gNB-DU.

Various signaling information may be exchanged in network 100 to provide information related to transmission parameters and allocation of resources for data transmission. Signaling information may be provided on various levels of a protocol stack.

A base station, such as for example gNB 120, may comprise one or more antenna panels or be configured to transmit one or more beams. A directive beam may be for example generated based adjusting relative amplitude and phase shifts in an antenna array. In cellular communication systems, different users may be assigned to different beams or panels to obtain desired radio link conditions for each user. The network 100 may also comprise multiple transmission and/or reception points, such as for example one or more remote radio heads or relay nodes, to provide sufficient radio link to UE 110 in any situation. Since UE 110 may be a mobile device, the network may be configured to perform a handover of the UE 110 from one gNB to another to maintain connectivity. Furthermore, the network may be configured to use different radio access technologies (RAT) when communicating with UE 110. For example, a 5G network may determine to perform an inter-RAT handover to 4G, for example to maintain connectivity to UE 110. It is understood that different configurations of beams, panels, or transmission points, as well as performance of a handover or changes in radio access technology may affect transmission characteristics of UE 110 and thereby also affect exposure of the user to the radiated signals.

Figure 2:
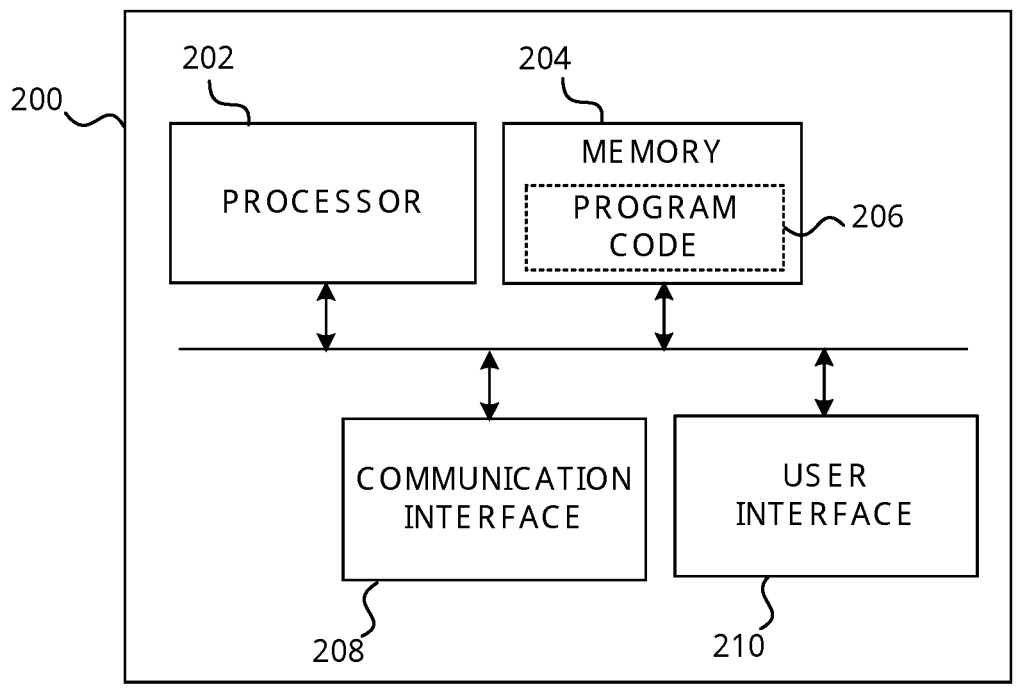
FIG. 2 illustrates an example of an apparatus configured to perform one or more example embodiments.

FIG. 2 illustrates an example of an apparatus 200 according to an embodiment, for example a client node such as for example a UE 110, or a network node such as for example a gNB 120. Apparatus 200 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise communication interface 208 configured to enable apparatus 200 to transmit and/or receive information, for example signaling information and/or data packets to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide also one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a local wired connection such as for example a local area network (LAN) connection or a universal serial bus (USB) connection, or the like; or a wired Internet connection. Communication interface 208 may comprise, or be coupled to, at least one antenna or antenna array to transmit and/or receive radio frequency signals.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 206 comprised, for example, in the memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, apparatus 200 may comprise a vehicle such as for example a car. Although apparatus 200 is illustrated as a single device it is appreciated that, wherever applicable, functions of apparatus 200 may be distributed to a plurality of devices, for example to implement example embodiments as a cloud computing service.

Figure 3:
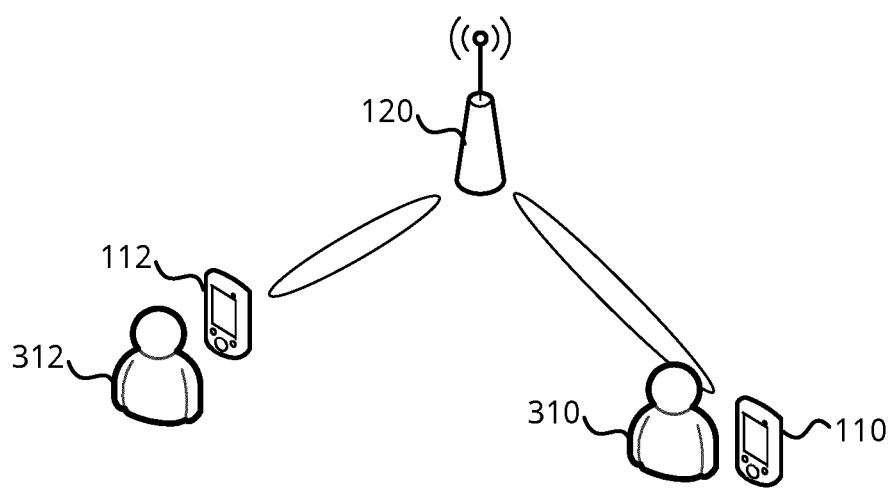
FIG. 3 illustrates an example of uplink communication in two scenarios with respect to different locations of a user equipment, according to an example embodiment.

FIG. 3 illustrates an example of uplink communication in two scenarios with respect to different locations of a user equipment, according to an example embodiment. In one scenario, user 312 may hold UE 112 such that there's an unobstructed line of sight (LOS) path from the UE 112 to the gNB 120. Because there's no obstruction, the effective isotropically radiated power (EIRP) is at maximum. In another scenario, user 310 may hold UE 110 such that body of the user 310 is on the path from the UE 110 to the gNB 120. In this scenario the user 310 is exposed to the radiated beam, and therefore, as the distance to the user's body decreases, the output power of the UE 112 may need to be reduced to a safe level to comply with MPE.

Figure 4:
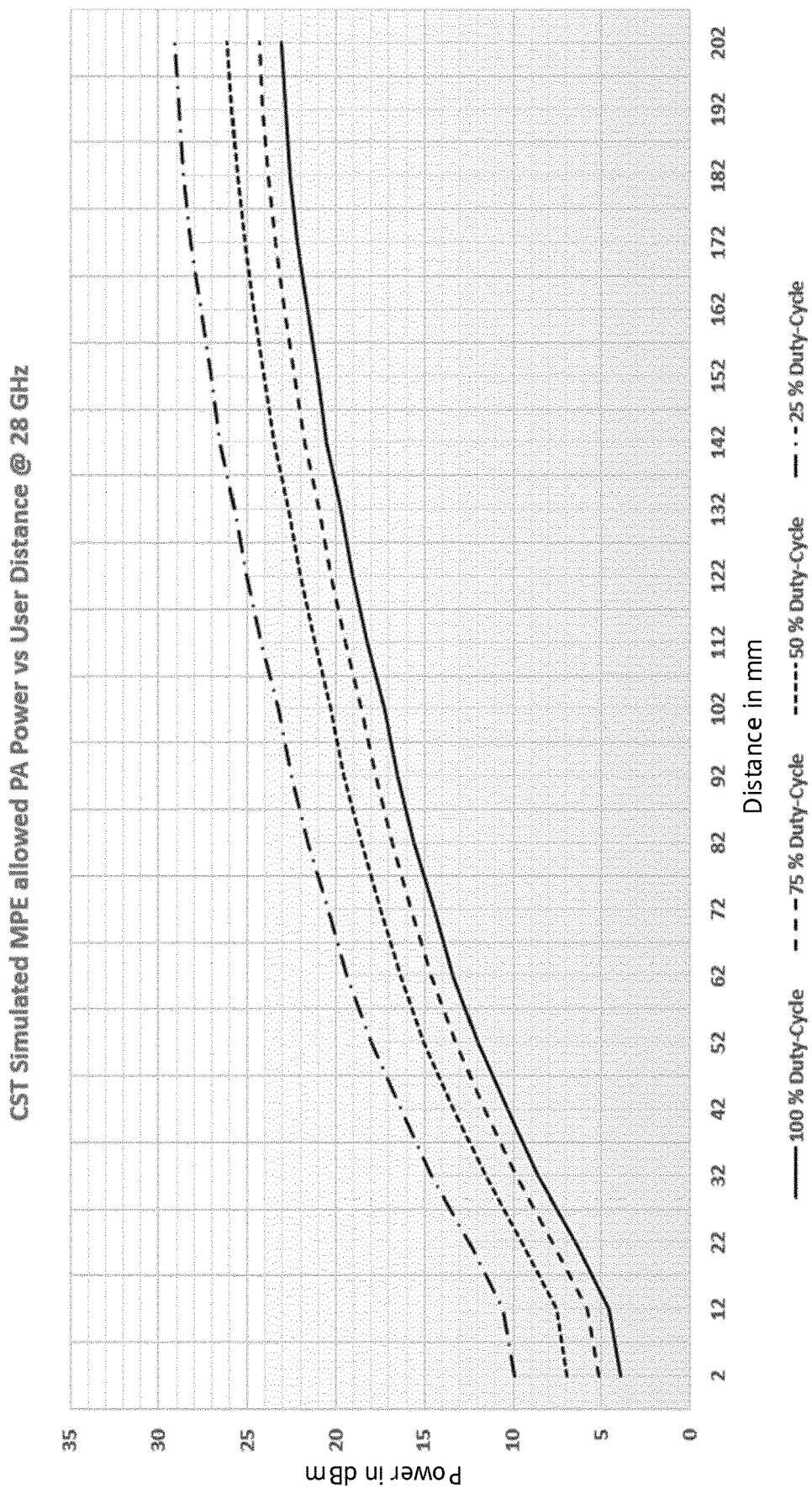
FIG. 4 illustrates an example of user equipment (UE) power back-off for complying with maximum permissible exposure (MPE) requirement, according to an example embodiment.

FIG. 4 illustrates an example of UE power back-off for complying with MPE, according to an example embodiment. In FIG. 4, the MPE allowed power amplifier (PA) power is provided with respect to the distance to a user (mm) from the surface of the antenna. The four curves illustrate the allowed PA power for duty cycles 100%, 75%, 50%, and 25%. A duty cycle may refer to the fraction of time, during which the UE 110 is transmitting. UE 110 may be configured to reduce its output power and/or duty cycle, in order to comply with MPE. For example, when approaching the user, at 100 mm the UE 110 may be configured to reduce its duty cycle from 50% to 25% in order to maintain 23 dBm PA power until the distance to the user is approximately mm. From 192 mm onwards, UE 110 may be configured to reduce its PA power according to the curve of 25% duty cycle. Moreover, the peak EIRP drops to 8 dBm at 2 mm on a 100% duty cycle. Thus, up to a 26 dB drop can be observed in the transmitted power from the UE 110 in presence of the user nearly touching the antenna. Furthermore, this example is based on a 2×2 antenna array and a larger antenna array may require the UE 110 to reduce its power before 192 mm.

The uplink (UL) communication may be affected by the allowed output power level. FIG. 4 also shows that a trade-off can be found between the transmit power and the duty cycle. However, if the user is sufficiently close to the antenna, the UE 110 may need to reduce its output power as well as set a restriction on the duty cycle. According to FIG. 4, even a duty cycle of 25% may require reducing the PA power. Therefore, adjusting the duty cycle alone may not be enough to address the MPE limitations. Moreover, lower duty cycles, for example below 20%, may in some circumstances cause radio link failure.

5G NR may operate at very high frequencies and therefore high gain antennas may be used to maintain a good signal. As a UE should comply with MPE, output power may be reduced if the user comes in close vicinity of the UE. However, in 5G or any other systems, for example systems applying mmW spectrum and directive link, excessively reducing the output power may lead to losing the connection to the base station, for example gNB 120. This scenario may already happen for example when the user is located at 192 cm from the UE (even with the 2×2 array) and therefore the frequency of radio link failures due to MPE may be high.

Figure 5:
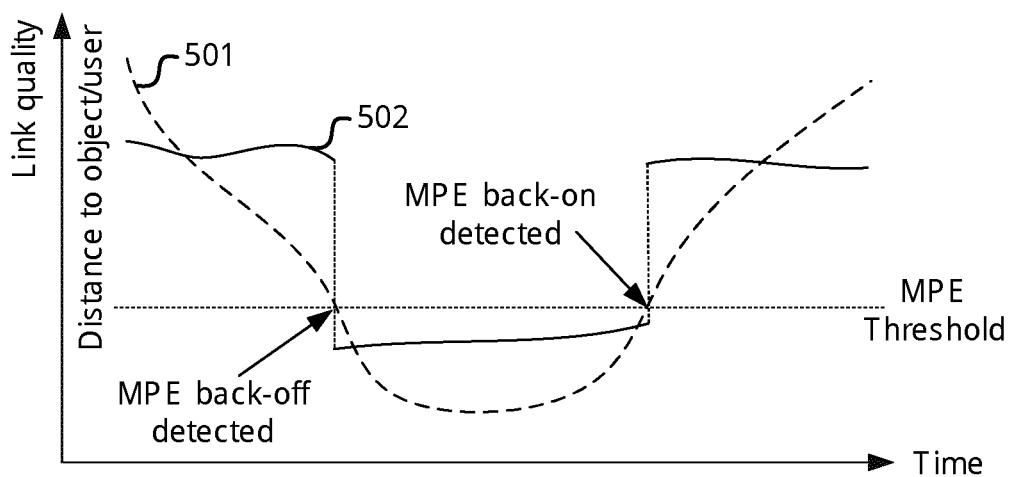
FIG. 5 illustrates an example of avoiding radio link failure by power back-on when distance to the user is safe, according to an example embodiment.

FIG. 5 illustrates an example of avoiding radio link failure by power back-on when distance to the user is safe, according to an example embodiment. The dashed curve 501 illustrates the link quality, for example between UE 110 and gNB 120, and the solid curve 502 illustrates the distance to an object or user, for example a distance between an antenna of UE 110 and the user. As the distance to the user decreases, the MPE threshold for power-back off is reached. Thus, the power may be decreased to a safe level until the UE 110 detects that the distance to the UE 110 is again large enough to be able to transmit with full power again.

Figure 6:
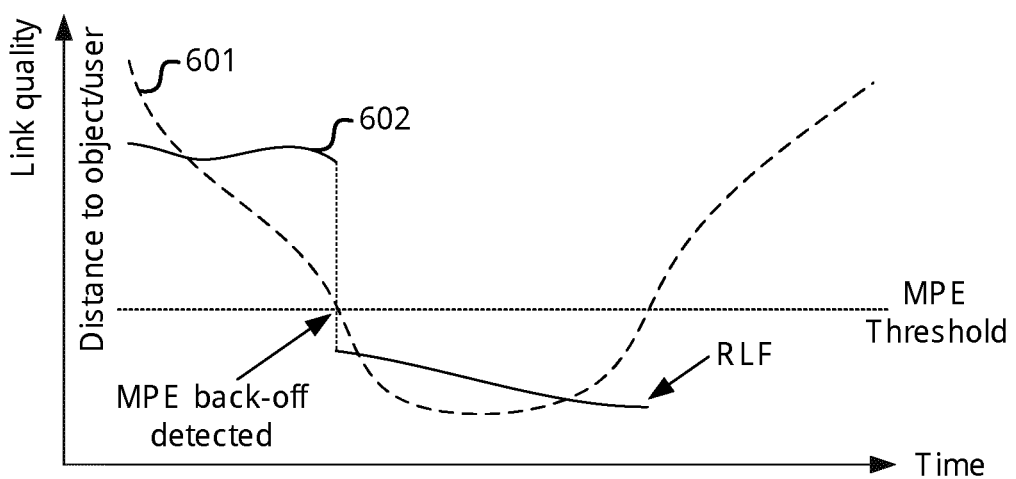
FIG. 6 illustrates an example of radio link failure due to power back-off, according to an example embodiment.

FIG. 6 illustrates an example of radio link failure due to power back-off, according to an example embodiment. Similar to FIG. 5, the dashed curve 601 illustrates the link quality and the solid curve 602 illustrates the distance to an object or user. In some cases, the link may be affected such that the gNB 120 cannot decode the uplink (UL) signal from UE 110 and a radio link failure (RLF) may happen before the distance to the user is allowing to transmit at full power again. The RLF may for example happen, because the gNB 120 is not aware of what causes the UL degradation, in this example the user 310 coming in close vicinity of the antenna at the UE 110. Neither the UE 110 nor the gNB 120 may have time to find a better option than the PBO to keep the link because the MPE compliance may be configured to be immediate. In FR2, blindly switching to another antenna without a priori knowledge of the links, for example without input from the gNB 120, may be as likely to cause an RLF as a 20-30 dB power back-off required on the primary link. Therefore, 5G may be susceptible to MPE issues, because time may be needed for example to align beams and characterize the best alternative link. Also, there's no mechanism to inform gNB 120 of the severe propagation conditions or even to check for a better option than performing a PBO, for example to redirect the beam, change panel, or perform a handover. Because the PBO can be significantly large, an RLF may occur as the gNB 120 may not be ready to cope with such drop in the uplink signal strength.

A communication system may apply various methods to alleviate the effect of power back-off. For example, a threshold may be set for a power reduction level. The threshold may be used to determine whether to use a restricted duty cycle. According to an example embodiment a restricted duty cycle, for example a maxUplinkDutyCycle, may be used if total power reduction level is less or equal to the threshold, for example a threshold of 9 dB. The threshold and the duty cycle may be associated with a frequency range, for example mmW frequencies. This may enable to meet a radio frequency (RF) exposure limitation, for example at a particular frequency range. According to an example embodiment, both the power reduction level threshold, such as for example P-MPR (power management maximum power reduction), and the restricted duty cycle, may be used, if the required total power reduction level is higher than a threshold, for example the threshold of 9 dB. According to an example embodiment, the power reduction level threshold and the restricted duty cycle may be decoupled, for example at a certain frequency range such as FR2. According to an example embodiment, if duty cycle of a UE 110 exceeds a predefined duty cycle, the UE 110 may be configured to determine power back-off parameters and to report them to the network, for example to gNB 120. According to an example embodiment, a default value for maximum uplink duty cycle may be 20% for 30 GHz and 40% for 40 GHz. The UE 110 may for example report its maximum uplink duty cycle by values between 20% and 90%, for example by steps of 10%.

Figure 7:
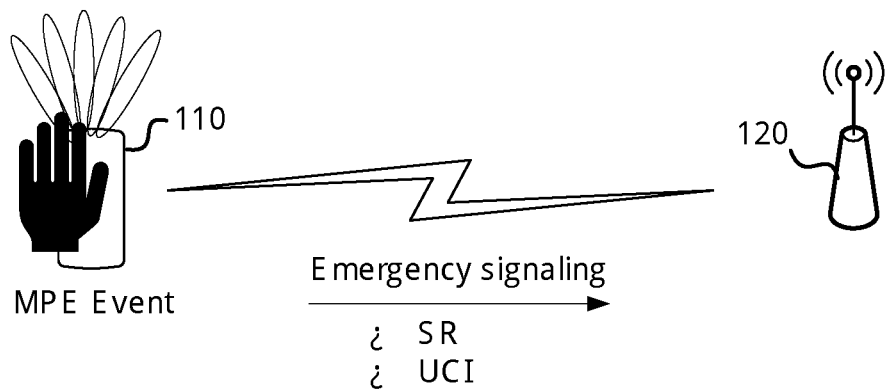
FIG. 7 illustrates an example of power back-off emergency signaling between a UE and a base station, according to an example embodiment.

FIG. 7 illustrates an example of power back-off emergency signaling between a UE 110 and gNB 120, according to an example embodiment. UE 110 may detect that user's location becomes critical with respect to the MPE threshold. The UE 110 may be configured to limit the duty cycle and/or the output power in order to comply with the MPE threshold. UE 110 may determine a power exposure event to be triggered. This may be for example in response to exceeding the MPE threshold, or, when being within margin from the MPE threshold. The MPE threshold may be for example defined as a maximum allowed power level with respect to the distance from the user.

The UE 110 may be further configured to send an indication of the triggered power exposure event to gNB 120. This indication may be included in an emergency signal or message, for example in a power back-off emergency signal or message, which may be sent to gNB 120 shortly before performing the power back-off. The gNB 120 is thus informed of the reason of the link imbalance and the possibility of a radio link failure. The gNB 120 may therefore attempt to mitigate the radio link degradation and avoid the radio link failure. It is beneficial to send the emergency signal or message fast. Therefore, the message may be sent as a physical layer message. The message may be for example sent by reusing fields of uplink control information (UCI) or at least one scheduling request (SR). Furthermore, the emergency signal or message may be sent during connected mode operation.

Figure 8:
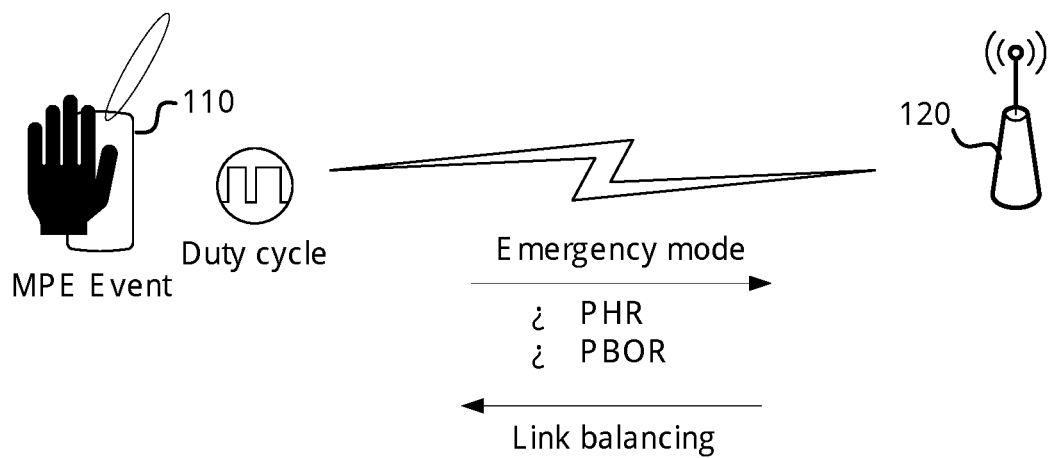
FIG. 8 illustrates an example of a power back-off emergency mode for avoiding radio link failure, according to an example embodiment.

FIG. 8 illustrates an example of a power back-off emergency mode for avoiding radio link failure, according to an example embodiment. After sending the emergency signal, the UE 110 may switch to a power back-off emergency mode. Thereafter, the UE 110 may prioritize keeping the maximum power, and therefore the UE 110 may reduce its duty cycle. In such configuration, the UE 110 may for example send a power headroom report (PHR), or a power back-off report (PBOR) to the gNB 120 indicating the required output power reduction. Thereupon, the gNB 120 can try to balance or redirect the link for example by increasing gain at gNB 120, switch serving panel, determining to perform handover, etc.

Figure 9:
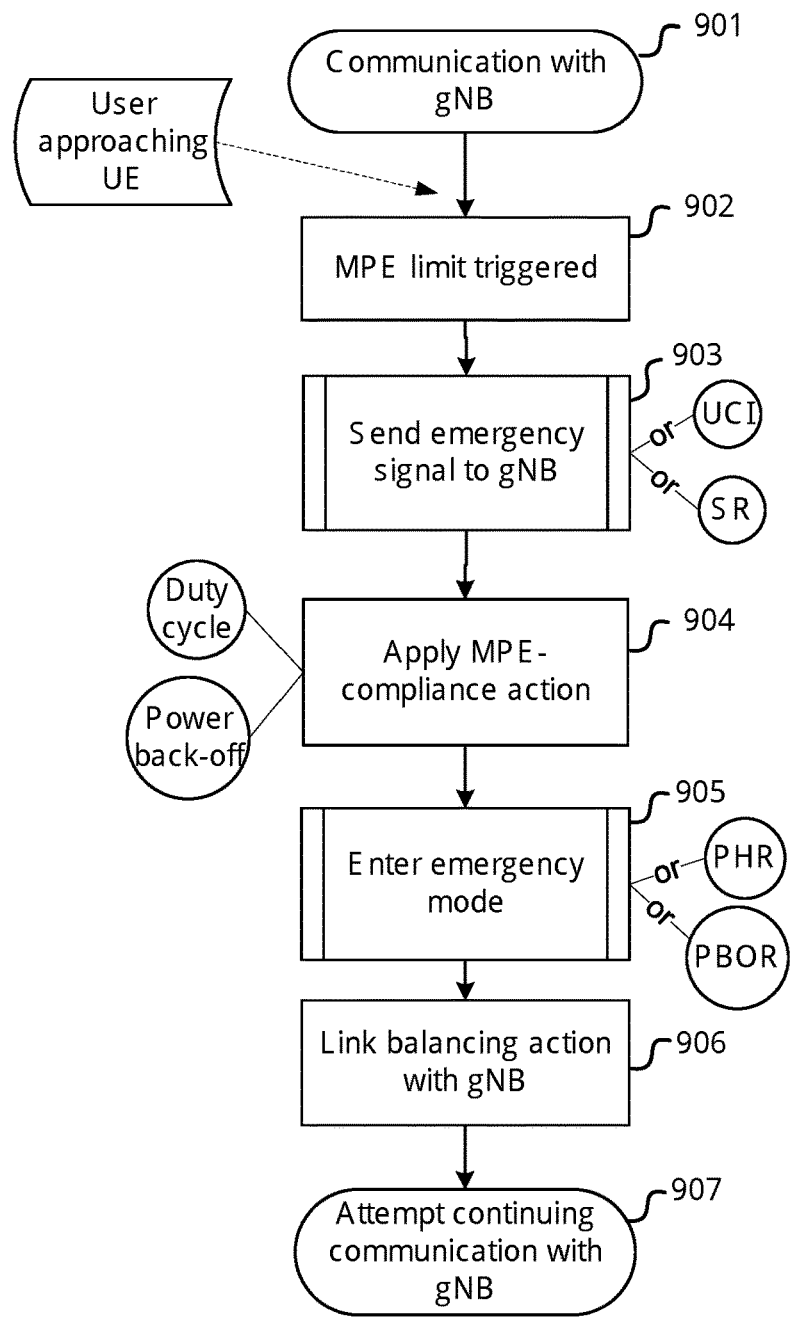
FIG. 9 illustrates an example of a flow chart for power back-off emergency signaling and power back-off emergency mode, according to an example embodiment.

FIG. 9 illustrates further features of the power back-off emergency signaling and power back-off emergency mode, according to an example embodiment. At 901, the UE 110 may communicate with gNB 120. While communicating with gNB 120, the UE 110 may detect an object for example a body part of a user approaching the UE 110. This may be detected for example based on signals received from one or more proximity sensors.

At 902, UE 110 may determine whether a power exposure event is triggered. According to an example embodiment this may comprise determining whether an MPE limit is triggered. The power exposure event may be triggered for example because of a user or an object becoming closer or because of increased transmit power. For example, UE 110 may determine a distance to the user based on the proximity sensor signals and compare the currently used transmit power to a maximum allowed transmission power level associated with the determined distance to the user. An association of the maximum transmit power to different distances may be stored in the memory of the UE 110. If the current transmit power exceeds the maximum allowed transmission power, or alternatively is within a margin from the maximum allowed transmission power, the UE 110 may determine that a power exposure event has been triggered.

The UE 110 may further determine an expected power reduction for not triggering the power exposure event. The expected power reduction may refer to an amount of power reduction required to comply with the MPE limit. For example, UE 110 may determine how much the current transmit power should be decreased in order for the resulting transmit power level not to exceed the MPE limit, or not to be within the margin from the MPE limit.

According to an example embodiment, the expected power reduction may be determined based on a duty cycle of the UE 110. UE 110 may be configured to determine an expected power reduction for a plurality of duty cycles. For example, an expected power reduction may be determined for the current duty cycle (e.g. 50%) and one or more reduced duty cycles (e.g. 25%, 14%, and 5%).

At 903, the UE 110 may send an indication of the triggered power exposure event to gNB 120. The indication may be for example sent as an emergency signal, as illustrated in FIG. 7. The indication may be for example included in uplink control information (UCI) or a scheduling request (SR). According to an example, embodiment, the indication of the power exposure event and the indication of the expected power reduction may be included in a single message. According to an example embodiment, the indication of the expected power reduction may also indicate triggering of the power exposure event.

The UE 110 may be configured with a time period for determining when and how to send the indication of the triggered power exposure event. According to an example embodiment, the UE 110 may comprise a timer, for example an MPE timer, for this purpose. The timer may be enabled in response to triggering of the power exposure event. The time period may be regulated by authorities, provided in standards, received from gNB 120, or configured as an implementation parameter at UE 110. According to an example embodiment, the time period may be in the range of 1 to 10 ms, for example 3 ms or 5 ms.

According to an example embodiment, UE 110 may be configured to send the indication of the triggered power exposure event before expiration of the time period. For example, the UE 110 may be configured to send the indication within a predetermined time period from triggering the power exposure event or in response to detecting expiry of the timer.

Figure 10:
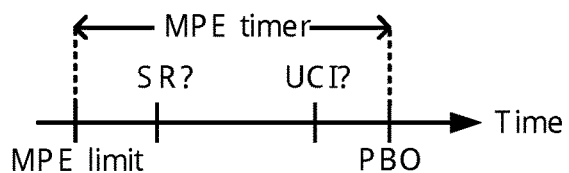
FIG. 10 illustrates an example of a timer for power back-off emergency signaling, according to an example embodiment.

FIG. 10 illustrates an example of using the MPE timer for emergency signaling, according to an example embodiment. It is appreciated that a timer period may generally refer to a configured time period, which may or may not be associated with a specific timer at UE 110. Therefore, many different implementations may be used for determining whether a timer period has expired.

During the MPE timer period the UE 110 may investigate different signaling options for informing the gNB 120 of the upcoming power back-off (PBO). The UE 110 may know when its next UCI is scheduled for, and thus UE 110 may choose the best option within the MPE timer period. For example, if no UCI is scheduled within the timer period or no CSI is included in a scheduled UCI, the UE 110 may determine to provide the indication of the triggered power exposure event in a scheduling request (SR), or use an SR to request to transmit a CSI. If there are one or more UCIs scheduled during the timer period, the UE 110 may determine to provide the indication of the triggered power exposure event in the next available UCI that includes CSI. If neither UCI nor SR can be scheduled within the time period, the UE 110 may alternatively use other resources for providing the indication. However, UCI or SR may provide faster communication as both of them may be transmitted as single L1 short messages.

According to an example embodiment, the indication of the triggered power exposure event may be provided by a combination of a channel state information and rank indication. For example, the indication of the triggered power exposure event may comprise setting a channel quality indicator (CQI) index to zero and a rank indicator (RI) greater than zero.

FIG. 11 illustrates an example of channel state information (CSI) table. The channel state information may be included in the uplink control information. The channel state information may comprise a plurality of channel quality indicator (CQI) indices associated with transmission parameter(s), such as for example a modulation and/or a code rate.

FIG. 12 illustrates an example of determining bitwidth in various situations. For example, bitwidth for rank indicator (RI) is given by $$\min(2,\lceil \log_2 n_{RI} \rceil).$$

where $n_{RI}$ is the number of allowed rank indicator values. A RI may indicate how well multiple antennas work. For example, in case of 2×2 MIMO, the RI value may be 1 or 2. Hence, when CQI index=0, setting RI to maximum may not be meaningful. Such combination could be therefore allocated to indicating power back-off related information, for example an indication of a power exposure event.

According to an example embodiment, the indication of the triggered power exposure event may be done by setting the CQI to index 0 'out of range' combined with the RI to a value larger than 1 (max value). This combination may not carry any practical meaning for making scheduling decision as the channel quality is out of range, and thus it may not be possible for the link to support multiple layers. Thus, this combination may be redefined to indicate emergency from the UE 110 because of an MPE event. A benefit of this approach is that the PBO emergency signaling may be provided without defining new signaling messages.

Figure 13:
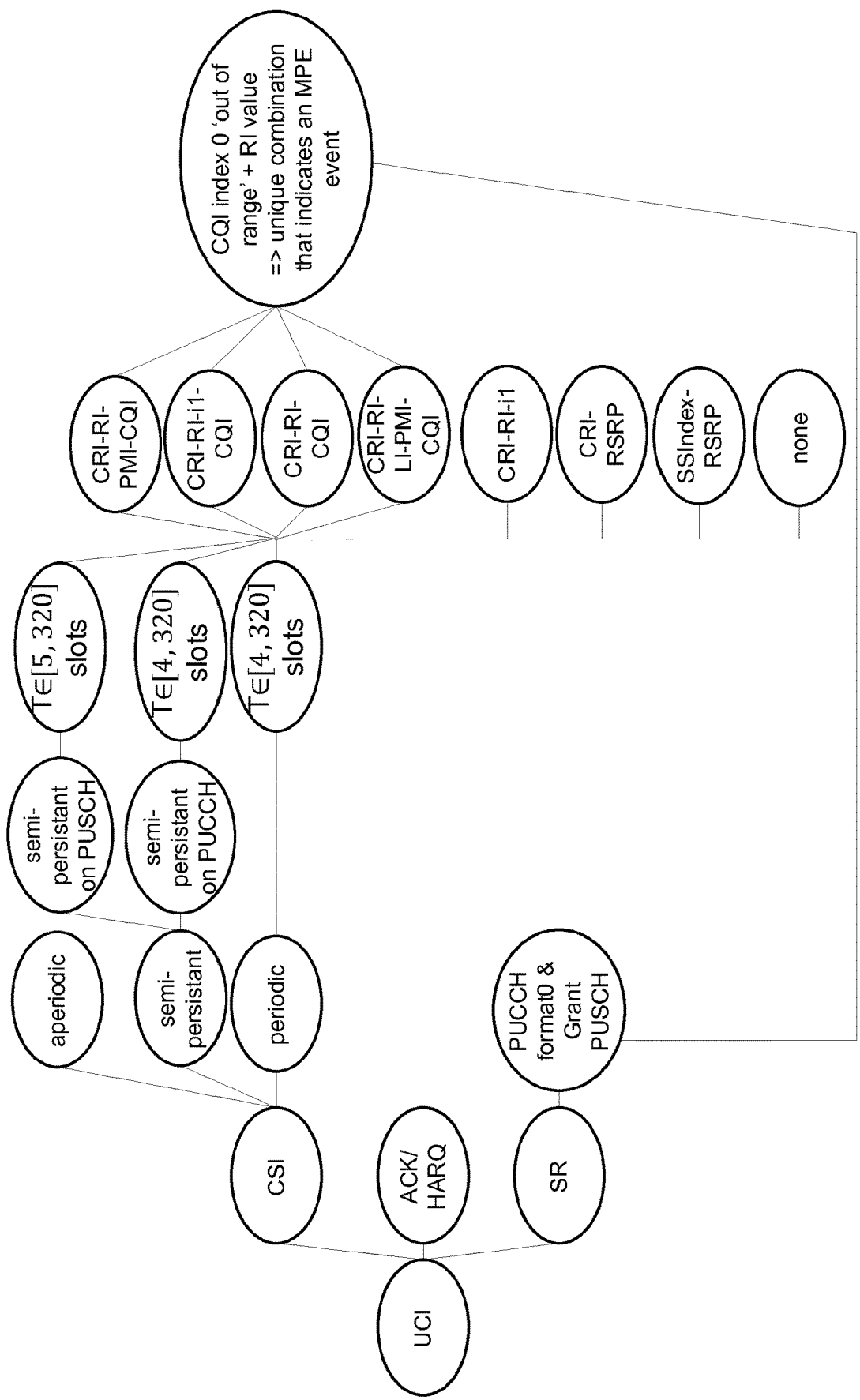
FIG. 13 illustrates an example of options for providing the power back-off emergency signaling, according to an example embodiment.

FIG. 13 illustrates an example of options for providing the power back-off emergency signaling, according to an example embodiment. The signaling may be sent before performing power back-off by various means.

Uplink control information (UCI) may comprise control information sent from UE 110 to the network, for example gNB 120. UCI may be carried for example by a physical uplink control channel (PUCCH) or a physical uplink shared channel (PUSCH). UCI may comprise channel state information (CSI), scheduling requests (SR), and/or other control information such as for example acknowledgement messages (ACK/HARQ). Since UCI may be carried on the physical layer (L1), delivery of UCI may be faster than other signaling information provided on upper protocol layers. Alternatively, any other physical layer signaling message may be configured to carry the indication of the triggered power exposure event and/or the indication of the expected power reduction.

Transmission of the CSI may be periodic, semi-persistent, or aperiodic. The periodic and semi-persistent reporting of CSI may be done at slot level. Therefore, the time it takes to send CSI may depend on numerology, for example the number of slots. A CSI period may be indicated, for example in milliseconds, by parameter CSI-ReportPeriodicityAndOffset. CSI may be transmitted for example at intervals of a few milliseconds, for example at intervals of 3 ms, 4 ms, or 7 ms, etc. In one example, an upper limit for the time for transmitting CSI may be 320 ms, as illustrated below.

CSI-ReportPeriodicityAndOffset::=CHOICE{
    slots4 INTEGER(0 . . . 3),
    slots5 INTEGER(0 . . . 4),
    slots8 INTEGER(0 . . . 7),
    slots10 INTEGER(0 . . . 39,
    slots16 INTEGER(0 . . . 15),
    slots20 INTEGER(0 . . . 19),
    slots40 INTEGER(0 . . . 39),
    slots80 INTEGER(0 . . . 79),
    slots160 INTEGER(0 . . . 159),
    slots320 INTEGER(0 . . . 319)}

Therefore, the indication of the power exposure event may be beneficially included in a periodic CSI to ensure fast delivery of the power back-off emergency signal to gNB 120. According to an example embodiment, a periodic CSI may be used to provide the indication, when UE 110 is in a connected mode.

According to an example embodiment, the indication of the triggering of the power exposure event may be included in semi-persistent CSI. Semi-persistent CSI may be transmitted on a physical uplink control channel (PUCCH) or a physical uplink shared channel (PUSCH). Semi-persistent CSI may provide an option for transmitting the indication of the power exposure event at a desired time.

The CSI may be transmitted by UE 110 as a CSI report, which may be generally used for example for link adaptation and scheduling of downlink data at gNB 120. CSI may include a channel quality indicator (CQI), a precoding matrix indicator (PMI), a rank indicator (RI), a layer indicator (LI), beam related information, or the like. The indication of the power exposure event may be included in various type of CSI, as illustrated in FIG. 13. As illustrated in FIG. 13 different types of CSI including the CQI and RI fields may be used for transmitting the indication of the power exposure event. The different slot options may be decided by gNB 120 independent of the power exposure event, but regardless of the slot options, the indication of the power exposure event may be provided within 320 ms.

As discussed above, the indication of the triggered power exposure event may be included in a scheduling request (SR). A scheduling request may be used for example if there's no UCI including CSI during the MPE timer period. A scheduling request may be transmitted as a physical layer message. A scheduling request may be sent by UE 110 to gNB 120 to request the gNB 120 to grant uplink resources, for example for transmitting data on the physical uplink shared channel (PUSCH). According to an example embodiment, the indication of the power exposure event may be transmitted using PUCCH format 0, which may be the shortest format available at PUCCH. This reduces the amount of resources needed for transmitting the indication of the power exposure event.

According to an example embodiment, UE 110 may send a scheduling request to request uplink resources for sending the indication of the triggered power exposure event. For example, the UE 110 may send the service request to request transmission resources for transmitting the power back-off emergency signal. The scheduling request may be configured to indicate the emergency mode.

In response receiving the requested uplink grant, the UE 110 may transmit the indication of the triggered power exposure event to the gNB 120 using the granted resources, for example on the physical uplink shared channel. The scheduling request may comprise an indication of the UE 110 entering a power back-off emergency mode.

At 903, the gNB 120 may receive the indication of the triggered power exposure event. The indication may be received based on any of the channels, messages, and/or indications used by UE 110 for sending them. For example, gNB 120 may be configured to detect the information transmitted by the UE 110 in UCI, for example in CSI or SR.

At 904, UE 110 may apply one or more MPE compliance actions. For example, UE 110 may reduce the duty cycle such that UE 110 complies with a power exposure requirement, for example the MPE limit. UE 110 may further lower its transmit power such that it complies with the power exposure requirement. The UE 110 may prioritize reducing the duty cycle to preserve the transmit power and therefore maximize the chance of being able to transmit further signals, for example a power headroom report or a power back-off report.

However, duty cycles below 20% may in some circumstances lead to a radio link failure due to difficulties in providing sufficient uplink to sustain the downlink communication. Therefore, duty cycle and transmit power may be compromised to improve chances of keeping the radio link to the gNB 120.

According to an example embodiment, UE 110 may determine whether the power exposure event continues to be triggered after applying the duty cycle reduction and apply a power reduction. Applying the power reduction may be in response to determining that the power exposure event continues to be triggered after applying the duty cycle reduction. For example, if UE 110 is not able to comply with the power exposure requirement without reducing the duty cycle below a threshold duty cycle, for example 20%, the UE 110 may additionally reduce the transmit power. This procedure may be iterated until UE 110 determines that it complies with the power exposure requirement. The amount of power reduction at one or more of the iterations may be preconfigured or determined based on the current transmit power and the power exposure requirement, for example the MPE limit.

According to an example embodiment, UE 110 may report its current duty cycle to gNB 120. UE 110 may enforce the duty cycle reduction on its own, but it may be beneficial for the gNB 120 to know that the duty cycle was reduced. The gNB 120 may take the reduced duty cycle into account in scheduling decisions. For example, if the gNB 120 asks the UE 110 to transmit more than a specific number of uplink slots or symbols within a defined observation window, the slots or symbols within the observation window exceeding the current duty cycle of UE 110 may not be transmitted, or a lower transmission power may be applied.

Applying the one or more MPE compliance actions at 904 may be in response to detecting expiry of the time period, for example based on the MPE timer. For example, UE 110 may apply the duty cycle reduction after, or in response to expiry of, the predetermined time period from triggering the power exposure event. The UE 110 may further apply the power back-off reduction and transition to the power back-off emergency mode after, or in response to, expiry of the time period.

At 905, the UE 110 and/or gNB 120 may enter a power back-off emergency mode. The emergency mode may be entered after sending or receiving the emergency signal, for example the indication of the triggered power exposure event. A purpose of the emergency mode may be to enable UE 110 to comply with MPE requirements while avoiding radio link failure.

In response to receiving the indication of the power exposure event triggered at UE 110, the gNB 120 may send a request to the UE 110 to transmit another power back-off emergency message to obtain further information about power exposure conditions of UE 110. Examples of the other power back-off emergency message include a power headroom report (PHR) or a power back-off report (PBOR). The request to transmit PHR or PBOR may be also in response to receiving a scheduling request transmitted by UE 110. The scheduling request may indicate that UE 110 has power back-off emergency related data to be transmitted.

The UE 110 may be configured to send an indication of the expected power reduction to gNB 120. The expected power reduction may be determined in order to comply with any power exposure requirements, as described above. For example, after UE 110 has reduced the duty cycle, and optionally the output power to prevent excessive duty cycle restriction (e.g. below 20%), the UE 110 may send a message to gNB 120 indicating the amount of power it would need to reduce to keep the duty cycle at a certain value, for example 20%, 50% or 100%. The indication of the expected power reduction may be therefore sent as a message including an indication one or more expected power reductions and indications of one or more corresponding duty cycles.

According to an example embodiment, the indication of the expected power reduction may be sent in the power headroom report (PHR). A power headroom report may be for example provided as a medium access control element (MAC CE). In general, UE 110 may send a PHR to indicate how much transmission power is still available in addition to the power being used for current transmission, but according to an example embodiment PHR may be configured to include the indication of the expected power reduction.

According to an example embodiment, bit(s) or field(s) of the power headroom report may be redefined to indicate the expected power reduction. For example, at least one bit of the power headroom report may indicate that a field of a header of the power headroom report is replaced by the indication of the expected power reduction. The expected power reduction may for example comprise a power management maximum power reduction (P-MPR) value. The header may comprise a MAC header of the power headroom report.

According to an example embodiment, the power headroom report may be repurposed for the MPE application based on reusing a Pcmax or PH field in the MAC header. A power headroom report may for example use one or more reserved bits to indicate replacement of the Pcmax field to indicate P-MPR. According to an example embodiment, reporting the expected power reduction based on transmitting a PHR on the physical uplink shared channel (PUSCH) may be prioritized as requested from gNB 120. The power headroom report may be sent by the UE 110 in response to a power headroom report request received from gNB 120.

According to an example embodiment, the UE 110 may send the indication of the expected power reduction in a power back-off report (PBOR). The power back-off report may further comprise an indication of the duty cycle of the UE 110. A PBOR may be provided as an extension of a PHR or by definition of a new PBOR message. In order to provide the gNB 120 with more information on the power back-off conditions of UE 110, the PBOR may include both the duty cycle reduction and the required PBO, for example as an expected power reduction value. Based on the PBOR the gNB 120 can determine the type of link adaptation to be performed. and initiate the link adjustment. Payload of the PBOR may for example comprise a 2-field container, which may indicate the PBO (for example, up to 8 bits to indicating a value between 0 dB and 40 dB) and the duty cycle (for example, up to 8 bits to indicating a value between 0% and 100%). An identifier of UE 110, for example a cell radio network temporary identifier (C-RNTI), may be included in the emergency signaling, for example as part of UCI or SR.

The gNB 120 may receive the indication of the expected power reduction sent by the UE 110. For example, the gNB 120 may be configured to detect at least one bit indicating that a field of a received power headroom report is replaced by the indication of the power headroom report. Alternatively, the gNB 120 may receive the power back-off report and detect the indication of the expected power reduction and/or the expected duty cycle reduction of UE 110. Based on the received power reduction and/or duty cycle reduction values the gNB 120 may determine to perform the adaptation of the radio link.

At 906, the gNB 120 may perform the link balancing. For example, in response to receiving the indication of the power exposure event triggered at UE 110, the gNB 120 may adjust or adapt the link to avoid radio link failure. This may be in response to receiving the indication of the power exposure event from UE 110. Performing adaptation of the radio link may comprise adjusting one or more transmission parameters or selecting a different transmission configuration. For example, gNB 120 may determine to redirect at least one radio beam, determine to switch a panel, determine to apply multiple transmission and/or reception points, determine to perform a handover, determine to perform handover to a lower frequency range, or determine to switch a radio access technology. The adjustment may decrease the exposure of the user of UE 110 to the radiated power and therefore it may help to comply with power exposure requirement and to avoid radio link failure. After the gNB 120 has decided how to address the link degradation, the gNB 120 may inform the UE 110 the new regime it is requested to operate in (e.g. duty cycle and output power) to avoid radio link failure. According to an example embodiment, determining which link adaptation method(s) to apply may be based on the indication of the expected power reduction received from UE 110. Furthermore, determining which link adaptation method(s) to apply may be based on options available at UE 110, for example the number of panels or supported radio access technologies. Further criteria used by gNB 120 may include current cell load, available hardware capabilities, load of neighboring cells, or the like.

At 907, UE 110 may attempt to continue communicating with gNB 120. If the link adaptation at 906 was effective, UE 110 is able to maintain the radio link to gNB 120 without triggering the power exposure event again. UE 110 may however continue monitoring whether it meets the power exposure requirements and send another power back-off emergency signal if needed.

Various example embodiments disclose methods, computer programs and apparatuses for avoiding radio link failure due to a power exposure event. Since the UE 110 may be configured to inform the gNB 120 of the power exposure event and the related constraints, the gNB 120 may have more flexibility and means for mitigating the degradation of the radio link. The gNB 120 may for example perform link adaptation such that the unallowed power exposure situation may be avoided without excessively decreasing the transmit power at the UE 110.

Figure 14:
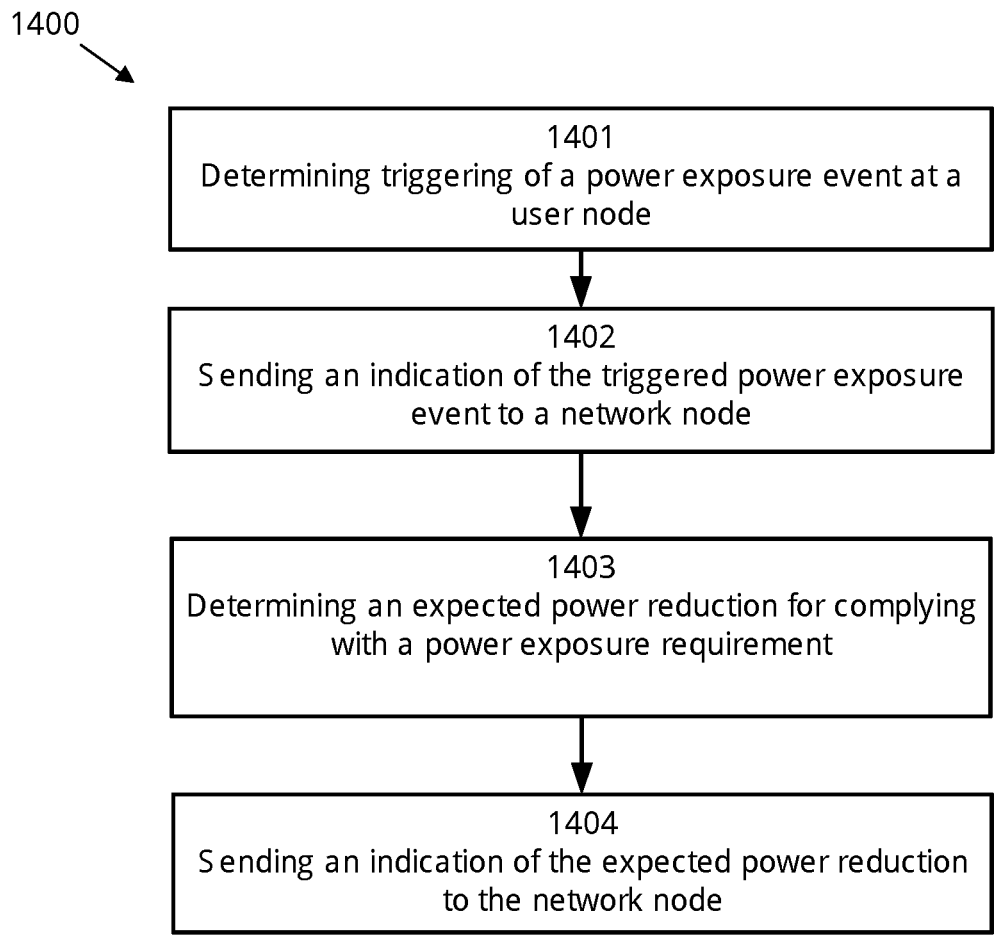
FIG. 14 illustrates an example of a method for reporting a power exposure event at a client node, according to an example embodiment.

FIG. 14 illustrates an example of a method 1400 for reporting a power exposure event, according to an example embodiment.

At 1401, the method may comprise determining triggering of a power exposure event at a user node.

At 1402, the method may comprise sending an indication of the triggered power exposure event to a network node.

At 1403, the method may comprise determining an expected power reduction for complying with a power exposure requirement.

At 1404, the method may comprise sending an indication of the expected power reduction to the network node.

Figure 15:
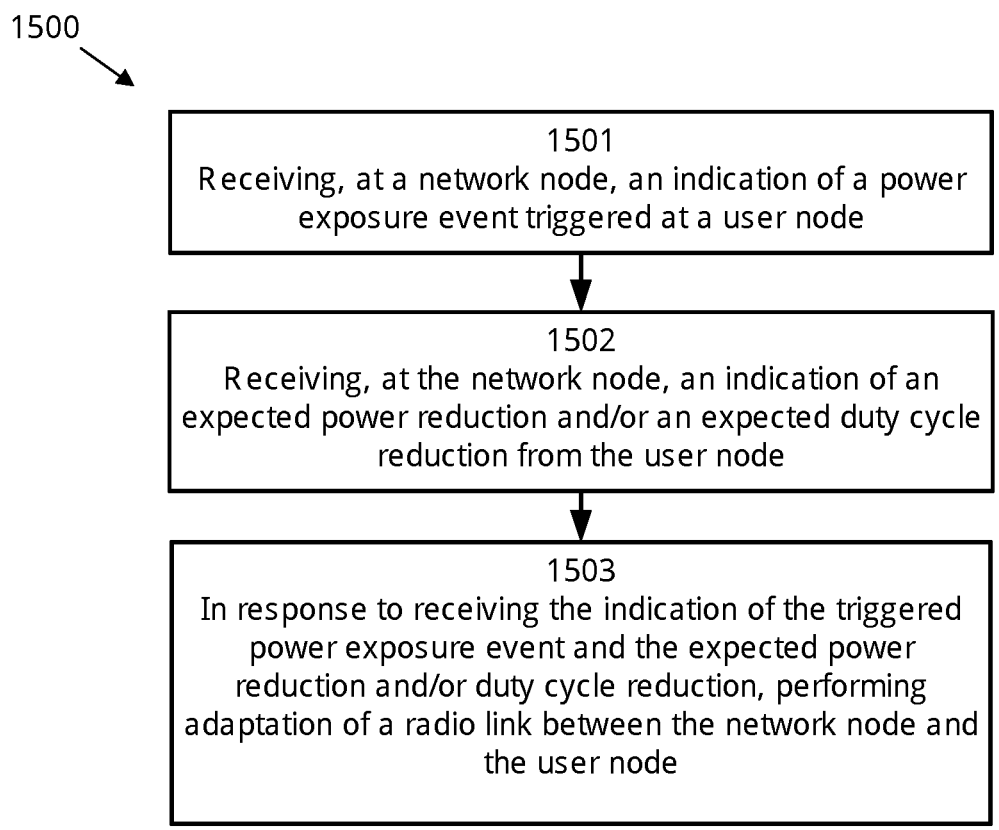
FIG. 15 illustrates an example of a method for performing radio link adaptation at a network node based on an indication of a power exposure event, according to an example embodiment.

FIG. 15 illustrates an example of a method 1500 for receiving an indication of a power exposure event and performing link adaptation, according to an example embodiment.

At 1501, the method may comprise receiving, at a network node, an indication of a power exposure event triggered at a user node.

At 1502, the method may comprise receiving, at the network node, an indication of an expected power reduction and/or an expected duty cycle reduction from the user node.

At 1503, the method may comprise performing adaptation of a radio link between the network node and the user node, for example in response to receiving the indication of the triggered power exposure event and the expected power reduction and/or duty cycle reduction.

Further features of the methods directly result from the functionalities and parameters of the client nodes, such as for example a UE 110, or network nodes such as for example a gNB 120, as described in the appended claims and throughout the specification, and are therefore not repeated here. Different variations of the methods may be also applied, as described in connection with the various example embodiments.

An apparatus, for example a client node such as UE 110, or a network node such as gNB 120 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein.

According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one non-transitory memory including computer program code that, when executed by the at least one processor, cause the at least one processor to perform the following operations:
determine a triggering of a power exposure event at a user equipment;
enable a timer in response to the triggering of the power exposure event;
send a first indication of the triggered power exposure event to a network device, wherein the first indication of the triggered power exposure event is sent before expiry of the timer;
determine an expected power reduction for complying with a power exposure requirement, wherein the expected power reduction is determined based on a duty cycle of the user equipment;
send second indication of the expected power reduction to the network device;
apply a duty cycle reduction in response to expiry of the timer;
determine that the power exposure event continues to be triggered after applying the duty cycle reduction;
send, to the network device, a third indication of a second expected power reduction and an expected duty cycle reduction; and
in response to receiving the third indication, perform adaptation of a radio link between the network device and the user equipment, wherein the adaptation of the radio link comprises:
determining to redirect at least one beam;
determining to switch a panel;
determining to apply multiple transmission and reception points;
determining to perform a handover; and
determining to switch a radio access technology.

2. The apparatus according to claim 1, wherein the first indication of the triggered power exposure event is included in uplink control information.

3. The apparatus according to claim 1, wherein the first indication of the triggered power exposure event comprises setting a channel quality indicator index to zero and a rank indicator greater than zero.

4. The apparatus according to claim 1, wherein the second indication of the expected power reduction is included in a power headroom report.

5. The apparatus according to claim 4, wherein at least one bit of the power headroom report indicates that a field of a header of the power headroom report is replaced by the second indication of the expected power reduction.

6. The apparatus according to claim 1, wherein the second indication of the expected power reduction is included in a power back-off report.

7. The apparatus according to claim 6, wherein the power back-off report further comprises a fourth indication of a duty cycle of the user equipment.

8. The apparatus according to claim 1, wherein the computer program code further cause the at least one processor to send a scheduling request to request uplink resources for sending the first indication of the triggered power exposure event.

9. The apparatus according to claim 1, wherein the first indication of the triggered power exposure event is included in a scheduling request.

10. An system comprising:
- a user equipment;
- a network device:
- at least one processor; and
- at least one non-transitory memory including computer program code that, when executed by the at least one processor, cause the at least one processor to perform the following operations:
  - determine a triggering of a power exposure event at the user equipment;
  - enable a timer in response to the triggering of the power exposure event;
  - send a first indication of the triggered power exposure event to the network device, wherein the first indication of the triggered power exposure event is sent before expiry of the timer;
  - determine an expected power reduction for complying with a power exposure requirement, wherein the expected power reduction is determined based on a duty cycle of the user equipment;
  - send a second indication of the expected power reduction to the network device;
  - apply a duty cycle reduction in response to expiry of the timer;
  - determine that the power exposure event continues to be triggered after applying the duty cycle reduction;
  - send, to the network device, a third indication of a second expected power reduction and an expected duty cycle reduction from; and
  - in response to receiving the third indication perform adaptation of a radio link between the network device and the user device, wherein the adaptation of the radio link comprises:
    - determining to redirect at least one beam;
    - determining to switch a panel;
    - determining to apply multiple transmission and reception points;
    - determining to perform a handover; and
    - determining to switch a radio access technology.

11. The system according to claim 10, wherein the third indication is included in a power headroom report.

12. The system according to claim 11, wherein at least one bit of the power headroom report indicates that a field of a header of the power headroom report is replaced by the third indication.

13. The system according to claim 12, wherein the third indication is received in a power back-off report.

14. The system according to claim 13, wherein the power back-off report further comprises a fourth indication of a duty cycle of the user device.

15. The system according to claim 10, wherein the first indication is received in uplink control information.

16. The system according to claim 10, wherein the computer program code further cause the at least one processor to send a request for a power headroom report or a power back-off report, in response to receiving the first indication.

17. The system according to claim 10, wherein the first indication comprises a channel quality indicator index set to zero and a rank indicator set greater than zero.

18. The system according to claim 10, wherein the first indication is included in a scheduling request.

19. A method comprising:
- determining a triggering of a power exposure event at a user equipment;
- enabling a timer in response to the triggering of the power exposure event;
  - sending a first indication of the triggered power exposure event to a network device, wherein the first indication of the triggered power exposure event is sent before expiry of the timer;
  - determining an expected power reduction for complying with a power exposure requirement, wherein the expected power reduction is determined based on a duty cycle of the user equipment;
  - sending second indication of the expected power reduction to the network device;
  - applying a duty cycle reduction in response to expiry of the timer;
  - determining that the power exposure event continues to be triggered after applying the duty cycle reduction;
  - sending, to the network device, a third indication of a second expected power reduction and an expected duty cycle reduction; and
  - in response to receiving the third indication, perform adaptation of a radio link between the network device and the user equipment, wherein the adaptation of the radio link comprises:
    - determining to redirect at least one beam;
    - determining to switch a panel;
    - determining to apply multiple transmission and reception points;
    - determining to perform a handover; and
    - determining to switch a radio access technology.

20. The method according to claim 19, wherein the first indication of the triggered power exposure event is included in uplink control information, and wherein the first indication of the triggered power exposure event comprises setting a channel quality indicator index to zero and a rank indicator greater than zero.

* * * * *